United States Patent
Li (10) Patent No.: US 9,917,881 B2
(45) Date of Patent: Mar. 13, 2018

(54) APPARATUS, SYSTEM, AND METHOD FOR TRANSFERRING DATA ACROSS MOBILE TERMINALS PAIRED USING NEAR FIELD COMMUNICATION (NFC)

(71) Applicant: Samsung Electronics Co. Ltd., Suwon-si, Gyeonggi-do (KR)

(72) Inventor: Zhiyun Li, Kenmore, WA (US)

(73) Assignee: Samsung Electronics Co., Ltd., Suwon-si (KR)

(*) Notice: Subject to any disclaimer, the term of this patent is extended or adjusted under 35 U.S.C. 154(b) by 182 days.

(21) Appl. No.: 13/657,060

(22) Filed: Oct. 22, 2012

(65) Prior Publication Data

US 2014/0113550 A1 Apr. 24, 2014

(51) Int. Cl.
| | |
|---|---|
| *H04B 5/00* | (2006.01) |
| *H04L 29/08* | (2006.01) |
| *H04W 4/00* | (2018.01) |
| *H04L 29/06* | (2006.01) |
| *H04M 1/725* | (2006.01) |

(52) U.S. Cl.
CPC ......... *H04L 67/06* (2013.01); *H04W 4/008* (2013.01); *H04L 67/2857* (2013.01); *H04L 69/14* (2013.01); *H04M 1/7253* (2013.01); *H04M 2250/02* (2013.01); *H04M 2250/04* (2013.01); *H04M 2250/64* (2013.01)

(58) Field of Classification Search
CPC ...... H04B 5/0031; H04B 5/00; H04B 5/0056; H04B 5/0062; H04B 5/02; H04B 7/24; H04W 4/008; H04W 8/005; H04W 76/02; G06Q 20/32; H04L 63/0492; H04L 2209/805; H04M 2250/04

USPC .............................. 455/41.1–41.3; 340/568.1
See application file for complete search history.

(56) References Cited

U.S. PATENT DOCUMENTS

| | | | | |
|---|---|---|---|---|
| 8,396,466 | B2 * | 3/2013 | Sharma ................. | H04W 99/00 455/41.2 |
| 2002/0184307 | A1 * | 12/2002 | Pineau ................. | G06F 3/1292 709/203 |
| 2005/0004986 | A1 * | 1/2005 | Aoki ...................... | G06F 9/543 709/206 |
| 2005/0198029 | A1 * | 9/2005 | Pohja .................. | H04M 1/7253 |
| 2006/0229015 | A1 * | 10/2006 | Park et al. .................. | 455/41.2 |
| 2007/0197261 | A1 * | 8/2007 | Humbel ................. | G06Q 30/00 455/558 |
| 2008/0079573 | A1 * | 4/2008 | Bloebaum ......... | G06F 17/30876 340/568.1 |
| 2008/0196040 | A1 * | 8/2008 | Mochel ............. | G06F 17/30557 719/316 |

(Continued)

FOREIGN PATENT DOCUMENTS

| | | |
|---|---|---|
| WO | 01/73674 A2 | 10/2001 |
| WO | 2010/089458 A1 | 8/2010 |

*Primary Examiner* — Max Mathew
(74) *Attorney, Agent, or Firm* — Jefferson IP Law, LLP (57) ABSTRACT

An apparatus and method for transferring data from a first mobile terminal to a second mobile terminal are provided. The method includes pairing the first mobile terminal and the second mobile terminal using Near Field Communication (NFC), selecting at least one item on the first mobile terminal to be transferred to the second mobile terminal, and confirming transfer of the at least one item to the second mobile terminal, and transferring the at least one item from the first mobile terminal to the second mobile terminal.

31 Claims, 6 Drawing Sheets

(56) References Cited

U.S. PATENT DOCUMENTS

| | | | |
|---|---|---|---|
| 2008/0270410 A1* | 10/2008 | Palnau | G06F 17/30722 |
| 2011/0081923 A1 | 4/2011 | Forutanpour et al. | |
| 2011/0093864 A1* | 4/2011 | Wood | G06F 9/541 |
| | | | 719/313 |
| 2011/0319016 A1* | 12/2011 | Gormley | H04B 5/0012 |
| | | | 455/41.1 |
| 2012/0178367 A1* | 7/2012 | Matsumoto | G06K 19/0707 |
| | | | 455/41.1 |
| 2013/0054464 A1* | 2/2013 | Lee | H04B 5/0031 |
| | | | 705/44 |
| 2013/0095753 A1* | 4/2013 | Chen | H04B 5/00 |
| | | | 455/41.1 |
| 2013/0127614 A1* | 5/2013 | Velusamy | 340/539.11 |
| 2013/0189925 A1* | 7/2013 | Staskawicz | H04B 7/24 |
| | | | 455/41.1 |
| 2013/0344804 A1* | 12/2013 | Chen | H04B 5/02 |
| | | | 455/41.1 |
| 2014/0162598 A1* | 6/2014 | Villa-Real | H04M 1/66 |
| | | | 455/411 |
| 2017/0120906 A1* | 5/2017 | Penilla | B60W 30/09 |

\* cited by examiner

APPARATUS, SYSTEM, AND METHOD FOR TRANSFERRING DATA ACROSS MOBILE TERMINALS PAIRED USING NEAR FIELD COMMUNICATION (NFC)

BACKGROUND OF THE INVENTION

1. Field of the Invention

The present invention relates to an apparatus, system, and method for transferring data across devices. More particularly, the present invention relates to an apparatus, system, and method for transferring data across mobile terminals using Near Field Communication (NFC).

2. Description of the Related Art

Mobile terminals are developed to provide wireless communication between users. As technology has advanced, mobile terminals now provide many additional features beyond simple telephone conversation. For example, mobile terminals are now able to provide additional functions such as an alarm, a Short Messaging Service (SMS), a Multimedia Message Service (MMS), E-mail, games, remote control of short range communication, an image capturing function using a mounted digital camera, a multimedia function for providing audio and video content, a scheduling function, and many more. With the plurality of features now provided, a mobile terminal has effectively become a necessity of daily life.

Recently, mobile terminals have been configured to transfer files to other mobile terminals. For example, mobile terminals have been configured to transfer files to another mobile terminal via Bluetooth pairing or Android Beam.

Bluetooth technology enables mobile terminals to pair with each other. The pairing process is triggered either by a specific request from a user of one mobile terminal to pair with another mobile terminal, or triggered automatically when connecting to a service requires the identity of the mobile terminal for security reasons. The pairing of mobile terminals through Bluetooth technology typically requires user interaction for confirming the identity of the devices to be paired. When mobile terminals are paired through Bluetooth technology, the paired mobile terminals create a link key to be shared with each other. This link key may be used to authenticate mobile terminals attempting to connect via Bluetooth technology. When mobile terminals are paired, the mobile terminals may transfer files between each other by using a specific application that permits a user to select files to transfer and to select a mobile terminal to which to transfer the selected files. Depending on the configuration of the receiving mobile terminal, a user of the receiving mobile terminal may have to accept the file transfer from the transferring mobile terminal.

Android Beam is a capability built into Android-based mobile terminals that enables proximity-based interaction between mobile terminals (e.g., peer-to-peer data exchange between Android-powered mobile terminals). For example, Android Beam enables files to be transferred from one mobile terminal to another mobile terminal by touching the mobile terminals together. Android Beam relies on Near Field Communication (NFC) capabilities of mobile terminals and works only when the mobile terminals are in close proximity to one another (e.g., less than or equal to approximately 4 inches). To transfer files using Android Beam, both the transferring mobile terminal and the receiving mobile terminal must be configured for NFC. To share information displayed on a transferring mobile terminal, the transferring mobile terminal and the receiving mobile terminal are brought in close proximity to each other. When the transferring mobile terminal and the receiving mobile terminal are brought in close proximity to each other, the transferring mobile terminal prompts the user to share the information via Android Beam. If the user of the transferring mobile terminal selects to share the information via Android Beam, the information is shared with the receiving mobile terminal. Accordingly, Android Beam is a feature that allows a mobile terminal to push an NDF Data Exchange Format (NDEF) message onto another mobile terminal by physically tapping the mobile terminals together.

Accordingly, there is a need for an apparatus, system, and method for transferring data across mobile terminals using a pairing by Near Field Communication (NFC). In particular, there is a need for a more intuitive apparatus, system, and method for transferring data across mobile terminals using a pairing by Near Field Communication (NFC).

The above information is presented as background information only to assist with an understanding of the present disclosure. No determination has been made, and no assertion is made, as to whether any of the above might be applicable as prior art with regard to the present invention.

SUMMARY OF THE INVENTION

Aspects of the present invention are to address at least the above-mentioned problems and/or disadvantages and to provide at least the advantages described below. Accordingly, an aspect of the present invention is to provide an apparatus and method for transferring data across mobile terminals using Near Field Communication (NFC).

In accordance with an aspect of the present invention, a method for transferring data from a first mobile terminal to a second mobile terminal is provided. The method includes pairing the first mobile terminal and the second mobile terminal using Near Field Communication (NFC), selecting at least one item on the first mobile terminal to be transferred to the second mobile terminal, and confirming transfer of the at least one item to the second mobile terminal, and transferring the at least one item from the first mobile terminal to the second mobile terminal.

In accordance with another aspect of the present invention, an apparatus for transferring data to at least one mobile terminal is provided. The apparatus includes a Near Field Communication (NFC) unit for pairing with the at least one mobile terminal, a communication unit for transferring at least one item to the at least one mobile terminal, and at least one controller for selecting the at least one item to be transferred to the at least one mobile terminal.

In accordance with another aspect of the present invention, an apparatus for receiving data from a mobile terminal is provided. The apparatus includes a Near Field Communication (NFC) unit for pairing with the mobile terminal, a communication unit for receiving at least one item from the mobile terminal, and at least one controller for confirming transfer of the at least one item.

In accordance with another aspect of the present invention, a system for transferring data from a first mobile terminal to a second mobile terminal is provided. The apparatus includes the first mobile terminal, and the second terminal, wherein the first mobile terminal includes a Near Field Communication (NFC) unit for pairing with the second mobile terminal, a communication unit for transferring at least one item to the second mobile terminal, and at least one controller for selecting the at least one item to be transferred to the at second mobile terminal, and wherein the second mobile terminal includes an NFC unit for pairing with the first mobile terminal, a communication unit for receiving the at least one item from the first mobile terminal, and at least one controller for confirming transfer of the at least one item.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain exemplary embodiments of the present invention will be more apparent from the following description taken in conjunction with the accompanying drawings, in which.

Throughout the drawings, it should be noted that like reference numbers are used to depict the same or similar elements, features, and structures.

DETAILED DESCRIPTION OF EXEMPLARY EMBODIMENTS

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions are omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention are provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

Exemplary embodiments of the present invention include an apparatus, system, and method for transferring data across devices. For example, exemplary embodiments of the present invention include an apparatus, system, and method for transferring data across devices that have paired using Near Field Communication (NFC).

Exemplary embodiments of the present invention include an apparatus, system and method for copying data from one device to another device. For example, the copying of data from one device to another device may include copying the data to a clipboard that associates and aggregates any data which a user has indicated as being available for transfer. Thereafter, the device to which the data is to be copied may select the data from the clipboard and paste the data thereto. Similarly, exemplary embodiments of the present invention may include cutting data from one device and pasting such data to another device. For example, the cutting of data from one device and pasting of such data to another device may include deleting all data from the source device (e.g., the device from which the data is cut) after all of the pastes (e.g., to the target device) are confirmed as complete or abandoned (e.g., either explicitly by a user of the source or target device, or via a timeout).

Exemplary embodiments of the present invention include an apparatus, system, and method for transferring data from multiple devices to multiple devices. For example, a first mobile terminal may select to copy (e.g., transfer) a first item to another device, a third mobile terminal may select to copy (e.g., transfer) a second item to another device, a second mobile terminal may select to paste at least one of the first item and the second item thereto, and a fourth mobile terminal may select to paste at least one of the first item and the second item thereto. As an example, after a mobile terminal selects to copy an item to another device, some metadata may be transferred to devices to which the mobile terminal is paired such that the devices may easily identify the item and the terminal from which the item may be received.

As a non-exhaustive illustration only, a device described herein may refer to mobile terminals such as a Personal Digital Assistant (PDA), a digital camera, a portable game console, an MP3 player, a Portable/Personal Multimedia Player (PMP), a handheld e-book, a portable lap-top Personal Computer (PC), a tablet PC, a Global Positioning System (GPS) navigation, and devices such as a desktop PC, a High Definition Television (HDTV), an optical disc player, a setup box, and the like capable of wireless communication or network communication consistent with that disclosed herein.

Figure 1:
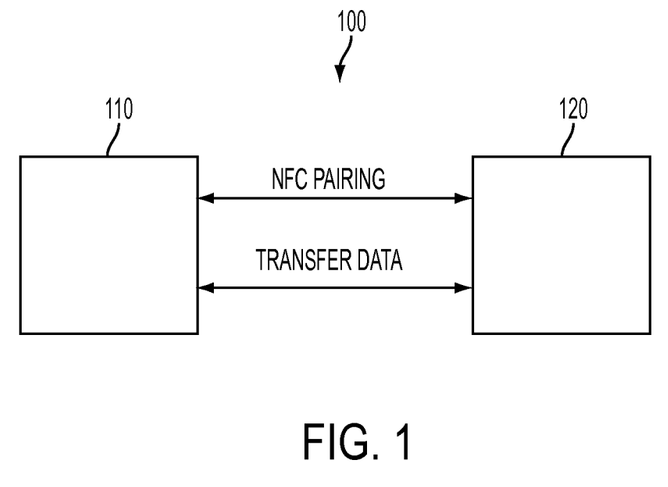
FIG. 1 illustrates a system for transferring data across devices according to exemplary embodiments of the present invention.

FIG. 1 illustrates a system for transferring data across devices according to exemplary embodiments of the present invention.

Referring to FIG. 1, the system 100 includes a first mobile terminal 110 and a second mobile terminal 120. According to exemplary embodiments of the present invention, the first mobile terminal 110 and the second mobile terminal 120 perform a pairing using Near Field Communication (NFC). For example, the first mobile terminal 110 and the second mobile terminal 120 may automatically communicate with each other using NFC upon the first terminal 110 and the second mobile terminal 120 being brought into close proximity with each other.

According to exemplary embodiments of the present invention, the mobile terminals may pair with more than one other mobile terminal at a time. For example, the first mobile terminal 110 may pair with the second mobile terminal 120 and a third mobile terminal (not shown). Similarly, the second mobile terminal 120 may pair with the first mobile terminal 110 and the third mobile terminal.

According to exemplary embodiments of the present invention, after the mobile terminals have paired via NFC, each of the mobile terminals may enable a feature set that allows sharing of data across the paired terminals. For example, upon pairing via NFC, each of the mobile terminals may launch an application that permits a user to select data to share or transfer and to identify to which mobile terminals the data is to be shared or transferred. A user of the first mobile terminal 110 may select data and load a menu (e.g., a copy, cut, and paste menu) that includes items relating to the sharing or transferring of files. For example, the menu may have items such as "copy to other device," and/or "paste from other device." As another example, the menu items may identify which devices (e.g., mobile terminals) the data may be shared with or transferred to. As yet another example, the menu items may provide the user with a selection of functions (e.g., copy, cut, paste, and the like) from which the user may select a desired function. The application may then provide the user with a selection of devices to which the mobile terminal is paired. The user may then select which of the devices to which the mobile terminal is paired that the user desires to be associated with the selected function. For example, if the user selects a function corresponding to copying the data, the application may then allow the user to select that the data is to be copied to any of the second mobile terminal 120 and the third mobile terminal. As another example, if the user selects a function corresponding to cutting the data, the application may then allow the user to select that the data is to be cut to any of the second mobile terminal 120 and the third mobile terminal.

According to exemplary embodiments of the present invention, recipient mobile terminals (e.g., those mobile terminals with which the data is shared or transferred) may confirm transfer of the data. For example, if the first mobile terminal 110 selects to share data with or transfer data to the second mobile terminal 120, then the second mobile terminal 120 may confirm transfer of the data before the data is transferred or copied to thereto. According to exemplary embodiments of the present invention, upon pairing of the second mobile terminal 120 with the first mobile terminal, the second mobile terminal 120 may launch an application that enables the second mobile terminal to confirm transfer of the data. For example, upon pairing with the first mobile terminal 110, the second mobile terminal may have a menu feature that when selected by a user displays an option to confirm transfer of the data. As an example, the menu may enable the second mobile terminal 120 to "paste from other device." As another example, the menu items may identify which devices (e.g., mobile terminals) have shared or initiated data transfer to the second mobile terminal 120. As yet another example, the menu items may provide the user with a selection of functions (e.g., copy, cut, paste, and the like) from which the user may select a desired function. The application may then provide the user with a selection of devices to which the mobile terminal is paired. The user may then select which of the devices to which the mobile terminal is paired that the user desires to be associated with the selected function. For example, if the user selects a function corresponding to paste data, the application may then allow the user to select which data is to be pasted from the first mobile terminal 110. If the user selects a function corresponding to paste data, the application may then display to the user a list of pending data sharing or data transfers from which the user may select to be pasted to the second mobile terminal 120.

After the recipient mobile terminal (i.e., the second mobile terminal 120 in the above example) confirms the transfer of the data, the data is transferred across the mobile terminals. For example, the data is transferred from the first mobile terminal 110 to the second mobile terminal 120.

According to exemplary embodiments of the present invention, some data such as, for example, metadata, may be transferred to the recipient mobile terminal (e.g., the second mobile terminal 120 in the above example) before the recipient mobile terminal confirms the transfer of the data. For example, such data may be transferred using NFC or other communication methods. Data that may be transferred before the recipient mobile terminal confirms the transfer of data may include, for example, a file name, a first few words of text, file or data size, the originating device name (e.g., the first mobile terminal 110 in the above example), and the like. A user of the recipient mobile terminal may view and select which data to proceed with transferring based at least in part on the data transferred before confirmation of the transfer of data. For example, the data transferred before confirmation of the transfer of data may be used to enable a user to make a more informed decision as to which data to paste to the recipient device.

According to exemplary embodiments of the present invention, data may include at least one of a file stored on a mobile terminal, text (e.g., text being displayed by the mobile terminal), an image (e.g., an image being displayed by the mobile terminal), and contact information for a contact stored in an address book on the mobile terminal. In this regard, data may be referred to as an item.

According to exemplary embodiments of the present invention, if the user selected a function corresponding to cutting the data from the first mobile terminal 110 and pasting the data to the second mobile terminal 120, then after the data is transferred from the first mobile terminal 110 to the second mobile terminal 120, the first mobile terminal 110 may delete the data therefrom. For example, the first mobile terminal 110 may delete the data associated with the cutting function after the first mobile terminal 110 has confirmed that the pasting of the data to the second mobile terminal 120 is complete or abandoned (e.g., either explicitly by a user of the first mobile terminal 110 or the second mobile terminal 120, or via a timeout).

Figure 2:
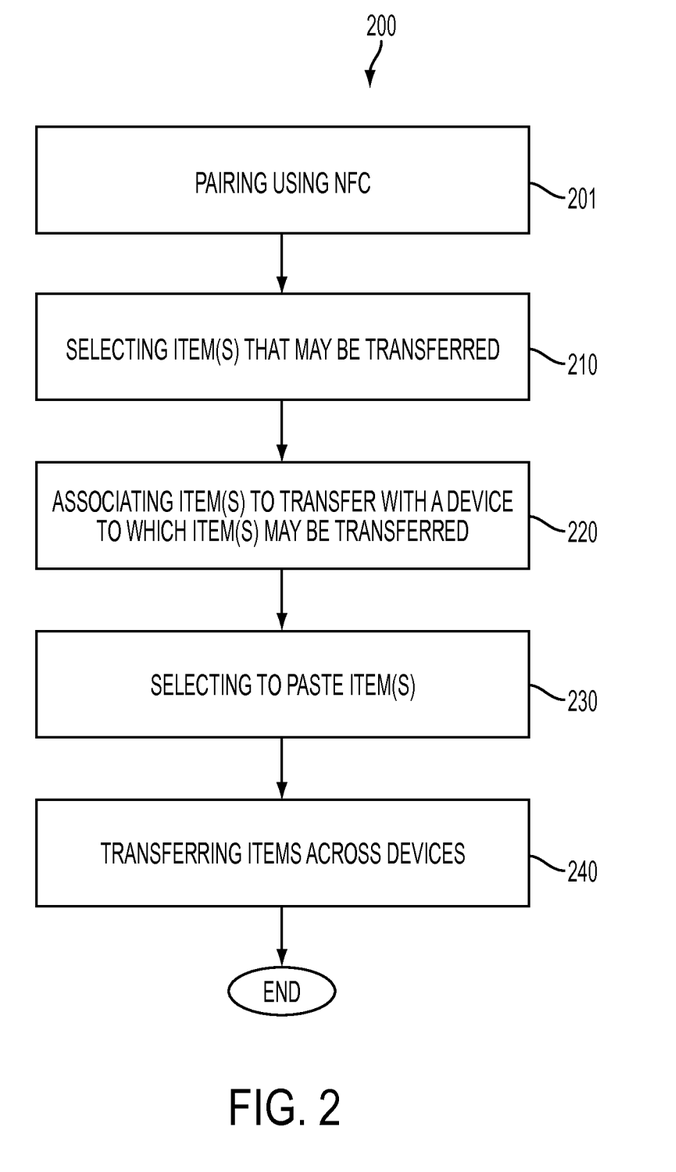
FIG. 2 is a flowchart illustrating a method of transferring data across devices according to an exemplary embodiment of the present invention.

FIG. 2 is a flowchart illustrating a method 200 of transferring data across devices according to an exemplary embodiment of the present invention.

Referring to FIG. 2, when mobile terminals are brought in close proximity to each other, the mobile terminals communicate with each other using NFC. By communicating with each other via NFC, the mobile terminal pair with one another at step 201.

After the mobile terminals are paired at step 201, each respective mobile terminal launches an application or enables a feature that allows for the transfer of data across the mobile terminals. The application or feature enabled by the mobile terminals upon pairing allows for a first mobile terminal to select the data (e.g., items) that may be transferred to a second mobile terminal at step 210. For example, the first mobile terminal may select which data to share with or transfer to the second terminal.

At step 220, the mobile terminal associates the data to be shared or transferred with a device to which the data may be shared or transferred. For example, with reference to FIG. 1, if the first mobile terminal 110 is paired with a second mobile terminal 120 and a third mobile terminal, then the first mobile terminal 110 may selectively associate the data to be shared or transferred with a device. The first mobile terminal 110 may associate the data to be shared or transferred with the second mobile terminal 120 or the third mobile terminal (or both). According to exemplary embodiments of the present invention, after the first mobile terminal 110 associates the data to be shared or transferred with a device, the first mobile terminal 110 may communicate with the device that such data is being shared or may be transferred to thereto. For example, the first mobile terminal 110 may transmit an indication to the second mobile terminal 120 that data has been shared by the first mobile terminal 110 with the second mobile terminal 120 or that the first mobile terminal 110 is attempting to transmit data to the second mobile terminal 120. As another example, the first terminal 110 may transfer to any device to which the data has been shared by the first mobile terminal 110 some metadata providing information on the data to be shared.

At step 230, a mobile terminal that receives the shared or transferred data selects the data to transfer. For example, with reference to FIG. 1, the second mobile terminal 120 selects the data to be transferred thereto. The second mobile terminal 120 may select to paste the data. According to exemplary embodiments of the present invention, a first mobile terminal 110 may copy data to a clipboard that associates any data that the first mobile terminal 110 has indicated as being available for transfer. As an example, the first mobile terminal 110 may register an identifier associated with another device such that the registration of the identifier indicates which devices are authorized recipients of the data (e.g., identifying which devices may paste the corresponding data from the clipboard). When the second mobile terminal 120 is paired with the first mobile terminal 110, the second mobile terminal 110 may paste data from a clipboard which includes the data copied by the first mobile terminal 110. The second mobile terminal 120 may have its access to data copied to the clipboard by the first mobile terminal 110 to only that data for which the second mobile terminal 120 has been identified as an authorized recipient. According to exemplary embodiments of the present invention, the second mobile terminal 120 may confirm transfer of the data thereto. According to exemplary embodiments of the present invention, the first mobile terminal 110 may indicate more than one device is an authorized recipient of the data.

According to exemplary embodiments of the present invention, some data such as, for example, metadata, may be transferred to the recipient mobile terminal (e.g., the second mobile terminal 120 in the above example) before the recipient mobile terminal confirms the transfer of the data. For example, such data may be transferred using NFC or other communication methods. Data that may be transferred before the recipient mobile terminal confirms the transfer of data may include, for example, a file name, a first few words of text, file or data size, the originating device name (e.g., the first mobile terminal 110 in the above example), and the like. A user of the recipient mobile terminal may view and select which data to proceed with transferring based at least in part on the data transferred before confirmation of the transfer of data. For example, the data transferred before confirmation of the transfer of data may be used to enable a user to make a more informed decision as to which data to paste to the recipient device.

At step 240, the data is transferred across the devices. For example, at step 240, the data is transferred from the first mobile terminal 110 to the second mobile terminal 120. According to exemplary embodiments of the present invention, the data may be transferred from the first mobile terminal 110 to the second mobile terminal 120 only after the second mobile terminal 120 confirms transfer of the data thereto.

According to exemplary embodiments of the present invention, if the user selected a function corresponding to cutting the data from the first mobile terminal 110 and pasting the data to the second mobile terminal 120, then after the data is transferred from the first mobile terminal 110 to the second mobile terminal 120, the first mobile terminal 110 may delete the data therefrom. For example, the first mobile terminal 110 may delete the data associated with the cutting function after the first mobile terminal 110 has confirmed that the pasting of the data to the second mobile terminal 120 is complete or abandoned (e.g., either explicitly by a user of the first mobile terminal 110 or the second mobile terminal 120, or via a timeout).

Figure 3:
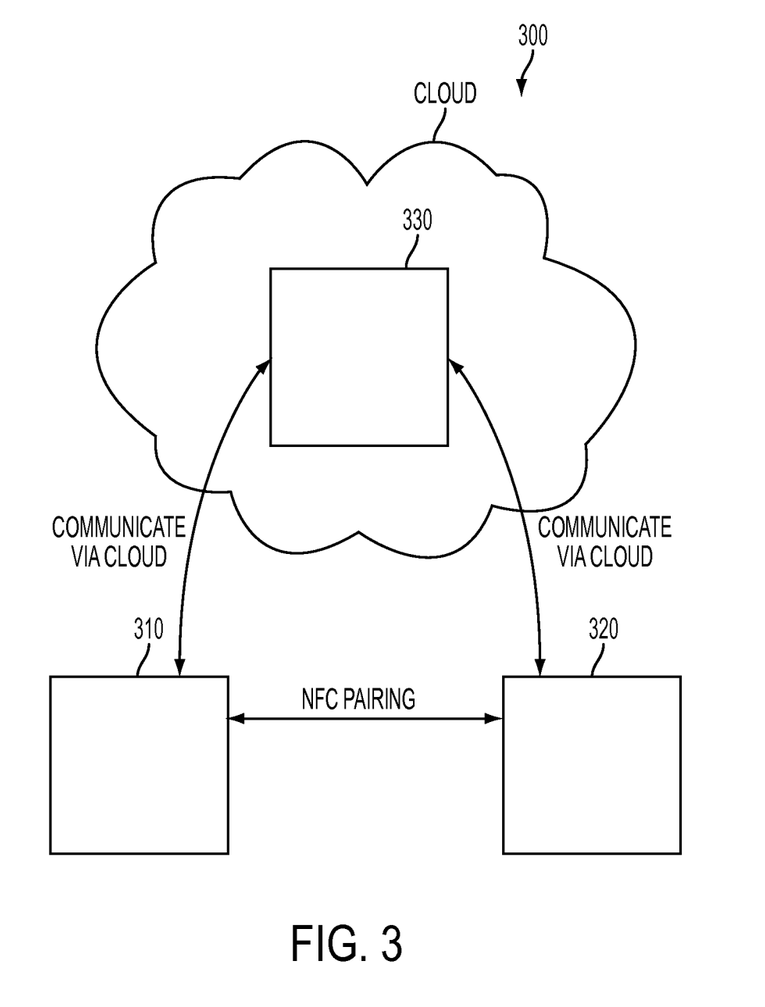
FIG. 3 illustrates a system for transferring data across devices according to exemplary embodiments of the present invention.

FIG. 3 illustrates a system for transferring data across devices according to exemplary embodiments of the present invention.

Referring to FIG. 3, the system 300 includes a first mobile terminal 310, a second mobile terminal 320, and at least one server 330. According to exemplary embodiments of the present invention, the at least one server 330 may be a cloud-based server. The at least one server 330 may provide cloud-based processing or services to the first mobile terminal 310 and the second mobile terminal 320.

As described above with reference to FIG. 1, the first mobile terminal 310 and the second mobile terminal 320 perform a pairing using NFC. Similarly, after the first mobile terminal 310 and the second mobile terminal 320 are paired, the first mobile terminal 310 may select to share data with or transmit data to another device. The first mobile terminal 310 may select the data to share or transfer, and may identify the other devices to which the data may be transferred. According to exemplary embodiments of the present invention, the first mobile terminal 310 may identify more than one device as a device to which the data may be transferred. According to exemplary embodiments of the present invention, an application or feature for selecting data to share or transfer and for sharing or transferring such data may be a cloud-based service. For example, if the first mobile terminal 310 runs an application or has a feature enabled that permits sharing or transferring of data to another device, the first mobile terminal 310 may communicate with at least one server 330 (e.g., a cloud-based server) so as to register with the at least one server 330 the data that is available for sharing or transferring and to register with the at least one server 330 the devices authorized to copy or download the data. The first mobile terminal 310 may use an identifier associated with another device as means for identifying the devices authorized to copy or download the data.

According to exemplary embodiments of the present invention, a mobile terminal may communicate with the at least one server 320 to determine whether any other devices have registered data which the mobile terminal may paste or download thereto. For example, the second mobile terminal 320 may communicate with the at least one server 320 to determine whether the first mobile terminal has selected and registered any data with the at least one server for which the second mobile terminal 320 is registered as a device authorized to copy or download the data. The second mobile terminal may then select which data to copy or download from the at least one server 320. According to exemplary embodiments of the present invention, the first mobile terminal 310 may upload the data to the at least one server 330 only after the second mobile terminal 320 has sent an indication that the second mobile terminal 320 has selected to paste or download the data.

According to exemplary embodiments of the present invention, some data such as, for example, metadata, may be transferred to the recipient mobile terminal (e.g., the second mobile terminal 320 in the above example) before the recipient mobile terminal confirms the transfer of the data. For example, such data may be transferred using NFC or other communication methods. Data that may be transferred before the recipient mobile terminal confirms the transfer of data may include, for example, a file name, a first few words of text, file or data size, the originating device name (e.g., the first mobile terminal 310 in the above example), and the like. A user of the recipient mobile terminal may view and select which data to proceed with transferring based at least in part on the data transferred before confirmation of the transfer of data. For example, the data transferred before confirmation of the transfer of data may be used to enable a user to make a more informed decision as to which data to paste to the recipient device.

According to exemplary embodiments of the present invention, when the second mobile terminal 320 has selected to paste or download data from the at least one server, the second mobile terminal 320 may locate the address associated with the first mobile terminal 310. For example, the second mobile terminal 320 may locate the cloud address associated with the first mobile terminal 310. Upon locating the address associated with the first mobile terminal 310, the second mobile terminal 320 pastes or downloads the data thereto.

According to exemplary embodiments of the present invention, if the user selected a function corresponding to cutting the data from the first mobile terminal 310 and pasting the data to the second mobile terminal 320, then after the second mobile terminal 320 pastes or downloads the data thereto, the first mobile terminal 310 may delete the data therefrom. For example, the first mobile terminal 310 may delete the data associated with the cutting function after the first mobile terminal 310 has confirmed that the pasting of the data to the second mobile terminal 320 is complete or abandoned (e.g., either explicitly by a user of the first mobile terminal 310 or the second mobile terminal 320, or via a timeout).

According to exemplary embodiments of the present invention, the at least one server 330 may be used as a temporary storage such that after all pastes or downloads for an associated data is complete, the at least one server 330 deletes the data. As an example, the at least one server 330 may track the count of devices doing pastes or downloads and then delete the data when such data is not needed any longer. As another example, the at least one server 330 may track which of the devices authorized to copy or download has completed the copy or download of the data, and upon completion of the copy or download of the data by all authorized devices, the at least one server 330 may delete the data. As another example, the at least one server 330 may delete the data after a predefined amount of time has passed. According to exemplary embodiments of the present invention, the at least one server 330 may cache the data recently stored thereto to ensure that the data is available if it is needed again.

Figure 4:
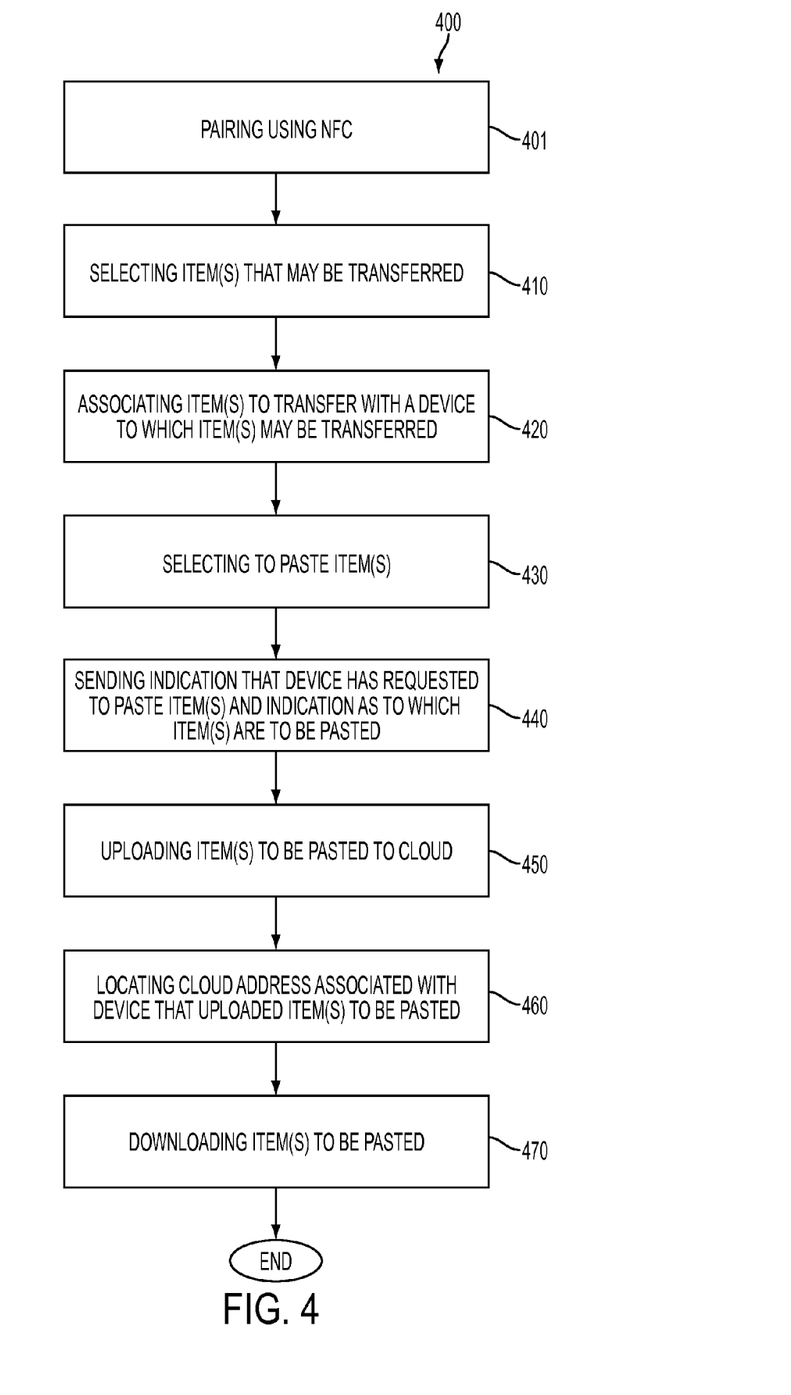
FIG. 4 is a flowchart illustrating a method of transferring data across devices according to an exemplary embodiment of the present invention.

FIG. 4 is a flowchart illustrating a method 400 of transferring data across devices according to an exemplary embodiment of the present invention.

Referring to FIG. 4, a first mobile terminal and a second mobile terminal are paired using NFC at step 401. After the mobile terminals are paired, the first mobile terminal may select the data which may be copied or transferred to the second mobile terminal According to exemplary embodiments of the present invention, the first mobile terminal may identify more than one device as a device to which the data may be transferred. As an example, the first mobile device may select the data which may be copied or transferred and may further select which of the devices to which the first mobile terminal is paired may receive (e.g., paste) the data to be transferred.

At step 410, the first mobile terminal selects the data that may be transferred. For example, the first mobile terminal may select which data is to be copied to a clipboard. A clipboard may be used to aggregate data that the first mobile terminal makes available for pasting or downloading by another device.

At step 420, the first mobile terminal associates the data that may be transferred with a device to which the data may be transferred. For example, the first mobile terminal may select at least one device with which the first mobile terminal is paired as a device authorized to paste or download the data. For example, the first mobile terminal may select a second mobile terminal as being authorized to paste or download the data. The first mobile terminal may register an identifier associated with the device(s) authorized to paste or download the data. The identifier may be registered with at least one server (e.g., a cloud-based server).

At step 430, the second mobile terminal selects to paste the data thereto. As an example, the second mobile terminal may confirm transfer of the data after the first mobile terminal has selected data to transfer and after the first mobile terminal has associated the data to be transferred with a device authorized to receive (e.g., paste or download) the data.

After the second mobile terminal selects to paste the data thereto at step 430, the second mobile terminal sends an indication that it has requested to transfer (e.g., to paste or to download) the data at step 440. The second mobile terminal may also send an indication as to which data is to be transferred to the second mobile terminal.

At step 450, the first mobile terminal uploads the data to at least one server (e.g., a cloud-based server). According to exemplary embodiments of the present invention, the first mobile terminal may upload the data to the at least one server only after the first mobile terminal receives an indication that the second mobile terminal confirms or requests to transfer (e.g., paste or download) the data. The first mobile terminal may only upload the data which the second mobile terminal has requested transfer thereto.

According to exemplary embodiments of the present invention, some data such as, for example, metadata, may be transferred to the recipient mobile terminal (e.g., the second mobile terminal in the above example) before the recipient mobile terminal requests the transfer of the data. For example, such data may be transferred using NFC or other communication methods. Data that may be transferred before the recipient mobile terminal requests the transfer of data may include, for example, a file name, a first few words of text, file or data size, the originating device name (e.g., the first mobile terminal in the above example), and the like. A user of the recipient mobile terminal may view and select which data to proceed with transferring based at least in part on the data transferred before requesting the transfer of data. For example, the data transferred before requesting the transfer of data may be used to enable a user to make a more informed decision as to which data to paste to the recipient device.

At step 460, the second mobile terminal locates the address associated with the first mobile terminal For example, the second mobile terminal may locate the cloud address for the first mobile terminal.

At step 470, the second mobile terminal pastes or downloads the data. For example, the second mobile terminal pastes or downloads the data from the cloud address for the first mobile terminal.

According to exemplary embodiments of the present invention, if the user selected a function corresponding to cutting the data from the first mobile terminal and pasting the data to the second mobile terminal, then after the second mobile terminal pastes or downloads the data thereto, the first mobile terminal may delete the data therefrom. For example, the first mobile terminal may delete the data associated with the cutting function after the first mobile terminal has confirmed that the pasting of the data to the second mobile terminal is complete or abandoned (e.g., either explicitly by a user of the first mobile terminal or the second mobile terminal, or via a timeout).

Figure 5:
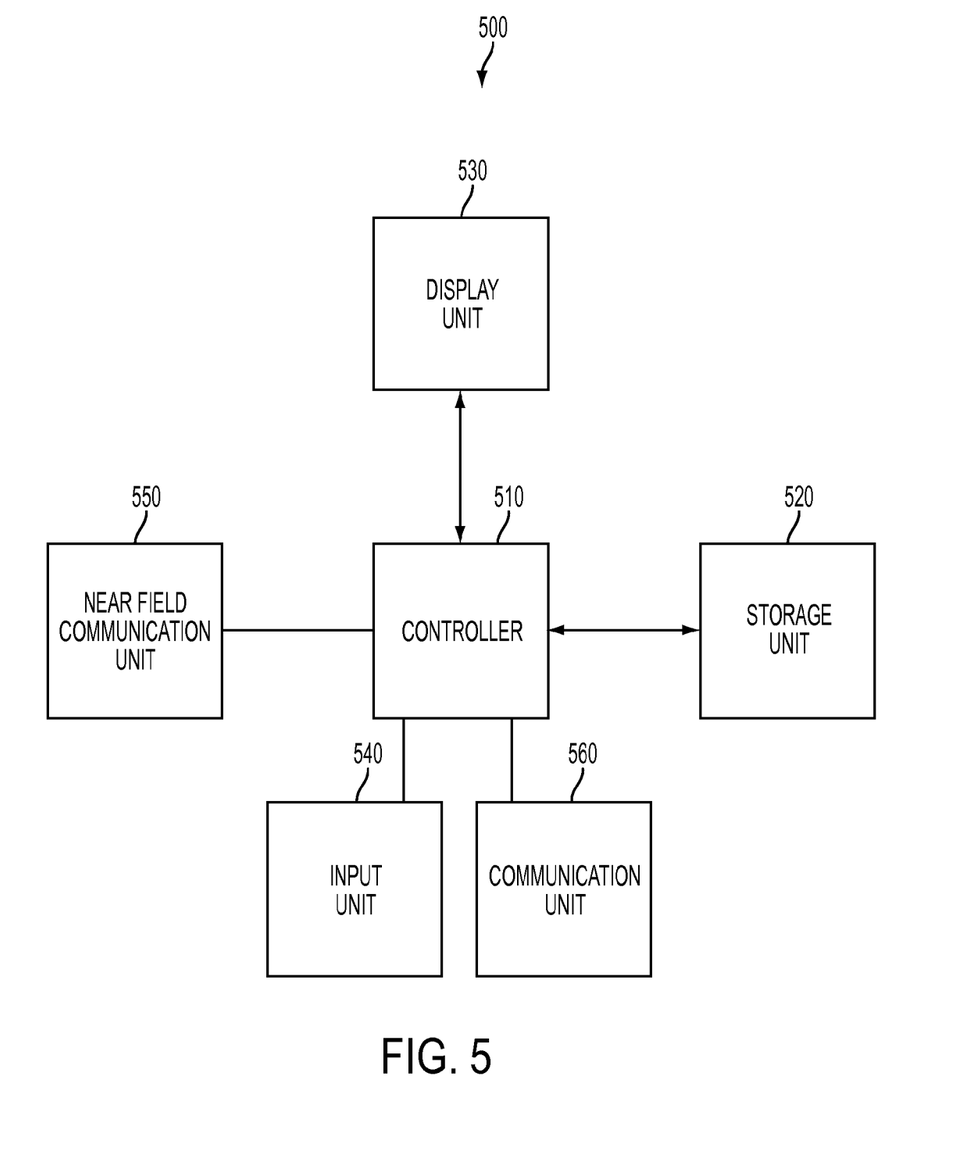
FIG. 5 is block diagram schematically illustrating a configuration of a mobile terminal according to an exemplary embodiment of the present invention.

FIG. 5 is block diagram schematically illustrating a configuration of a mobile terminal according to an exemplary embodiment of the present invention.

Referring to FIG. 5, the mobile terminal 500 includes a controller 510, a storage unit 520, a display unit 530, an input unit 540, a NFC unit 550, and a communication unit 560.

According to exemplary embodiments of the present invention, the mobile terminal 500 may be configured to transfer data to at least one device (e.g., a mobile terminal). The mobile terminal 500 may be configured to pair with another device using NFC when the mobile terminal 500 is brought into close proximity with the other device. According to exemplary embodiments of the present invention, the mobile terminal 500 may be paired with more than one other device. Upon pairing using NFC, the mobile terminal 500 may communicate with the other device to copy data from the mobile terminal 500 and paste or download the data to the other device. According to exemplary embodiments of the present invention, the mobile terminal 500 may be configured to select (e.g., enable a user to select) data to transfer to the other device. For example, the mobile terminal 500 may be configured to copy data to transfer to a clipboard that aggregates data for transfer and associates each of the data (e.g., each of the items) with a device authorized to paste or download the data. According to exemplary embodiments of the present invention, the mobile terminal 500 may be configured to communicate with at least one server (e.g., a cloud-based server) so as to transfer the data to the other device via the server (e.g., via the cloud). The mobile terminal 500 may be assigned an identifier from the at least one server upon registration of the mobile terminal 500 with the server. The identifier associated with the mobile terminal 500 may be used by other devices to locate the address of the mobile terminal 500 or to locate on the server data that has been uploaded by the mobile terminal 500.

The storage unit 520 can store user data, and the like, as well a program which performs operating functions according to an exemplary embodiment of the present invention. For example, the storage unit 520 may store a program for controlling general operation of a mobile terminal 500, an Operating System (OS) which boots the mobile terminal 500, and application program for performing other optional functions such as a camera function, a sound replay function, an image or video replay function, a Near Field Communication (NFC) function, and the like. Further, the storage unit 520 may store user data generated according to a user of the mobile terminal, such as, for example, a text message, a game file, a music file, a movie file, and the like. In particular, the storage unit 520 according to exemplary embodiments of the present invention may store a table which stores a mapping of data that may be transferred with devices to which the data may be transferred. For example, the storage unit 520 may store associations between at least one data item and a device to which the data may be transferred or which may request transfer thereof.

The NFC unit 550 may be configured for communicating with another device via NFC. According to exemplary embodiments of the present invention, the NFC unit 550 may be configured to automatically pair with another device. For example, the NFC unit 550 may pair the mobile terminal 500 with another device when the mobile terminal 500 is brought into close proximity with another NFC-enabled device. The NFC unit 550 communicates connection data with the other NFC-enabled device during the pairing process. The NFC paring may be used to communicate connection information between devices known to each other. If two NFC-enabled devices are unknown to each other, the NFC-enabled devices must be similarly configured to communicate the appropriate information. For example, the mobile terminal 500 and the other NFC-enabled device may be manually set up during configuration. According to exemplary embodiments of the present invention, the NFC unit 550 may transfer some data such as, for example, metadata to the recipient mobile terminal before the recipient mobile terminal confirms the transfer of the data. Data that may be transferred before the recipient mobile terminal confirms the transfer of data may include, for example, a file name, a first few words of text, file or data size, the originating device name, and the like.

The communication unit 560 may be configured for communicating with other devices. For example, the communication unit 560 may be configured to communicate via Bluetooth technology, WiFi technology, or another wireless technology. According to exemplary embodiments of the present invention, after the mobile terminal 500 is paired using NFC, the mobile terminal 500 may transfer data to another device via the communication unit 560. According to exemplary embodiments of the present invention, the communication unit 560 may transfer some data such as, for example, metadata to the recipient mobile terminal before the recipient mobile terminal confirms the transfer of the data. Data that may be transferred before the recipient mobile terminal confirms the transfer of data may include, for example, a file name, a first few words of text, file or data size, the originating device name, and the like.

The input unit 540 may include input keys and function keys for receiving user input. For example, the input unit 540 may include input keys and function keys for receiving an input of numbers or various sets of letter information, setting various functions, and controlling functions of the mobile terminal 500. For example, the input unit 540 may include a calling key for requesting a voice call, a video call request key for requesting a video call, a termination key for requesting termination of a voice call or a video call, a volume key for adjusting output volume of an audio signal, a direction key, and the like. In particular, the input unit 540 according to exemplary embodiments of the present invention may transmit to the controller 510 signals related to selection of data to transfer and/or selection of devices to which the data may be transferred. Such an input unit 540 may be formed by one or a combination of input means such as a touch pad, a touchscreen, a button-type key pad, a joystick, a wheel key, and the like.

The display unit 530 displays information inputted by user or information to be provided to user as well as various menus of the mobile terminal 500. For example, the display unit 530 may provide various screens according to a user of the mobile terminal 500, such as an idle screen, a message writing screen, a calling screen, and the like. In particular, the display unit 530 according to exemplary embodiments of the present invention can display a menu. The menu may include a list of functions relating to the transfer of data across devices. For example, the menu may include a list including a function corresponding to copying data to a device, pasting data from a device, cutting data and pasting such data to a device, and the like. The menu may be displayed to enable a user to select data to be transferred and/or to select a device to which the data may be transferred. For example, the display unit 530 may display an interface which the user may manipulate or otherwise enter inputs via a touch screen to enter selection of the data that may be transferred or selection of devices to which the data may be transferred. The display unit 530 can be formed as a Liquid Crystal Display (LCD), an Organic Light Emitting Diode (OLED), an Active Matrix Organic Light Emitting Diode (AMOLED), and the like. However, exemplary embodiments of the present invention are not limited to these examples. Further, the display unit 530 can perform the function of the input unit 540 if the display unit 530 is formed as a touch screen.

According to exemplary embodiments of the present invention, the mobile terminal comprises at least one controller 510. The at least one controller 510 may be configured to operatively control the mobile terminal 500. For example, the controller 510 may control operation of the various components or units included in the mobile terminal 500. The controller 510 may transmit a signal to the various components included in the mobile terminal 500 and control a signal flow between internal blocks of the mobile terminal 500. In particular, the controller 510 according to exemplary embodiments of the present invention can control selection of data to that may be transferred, selection of at least one device to which the data may be transferred, receipt of an indication of transfer from the device to which the data may be transferred, receipt of confirmation of transfer of the data to the other device, association of data that may be transferred with a device to which the data may be transferred, copy of data to a clipboard for aggregating data that may be transferred, deletion of the data associated with a cutting function after the mobile terminal 500 has confirmed that the pasting of the data to another mobile terminal is complete or abandoned (e.g., either explicitly by a user of the first mobile terminal 500 or the other mobile terminal, or via a timeout), and registration of data to be copied to a clipboard with an identifier associated with a corresponding device to which the data may be transferred. According to exemplary embodiments of the present invention, the controller 510 may be configured to control the transfer of some data such as, for example, metadata, to the recipient mobile terminal before the recipient mobile terminal confirms the transfer of the data. For example, such data may be transferred using NFC or other communication methods. Data that may be transferred before the recipient mobile terminal confirms the transfer of data may include, for example, a file name, a first few words of text, file or data size, the originating device name, and the like. A user of the recipient mobile terminal may view and select which data to proceed with transferring based at least in part on the data transferred before confirmation of the transfer of data. For example, the data transferred before confirmation of the transfer of data may be used to enable a user to make a more informed decision as to which data to paste to the recipient device.

Figure 6:
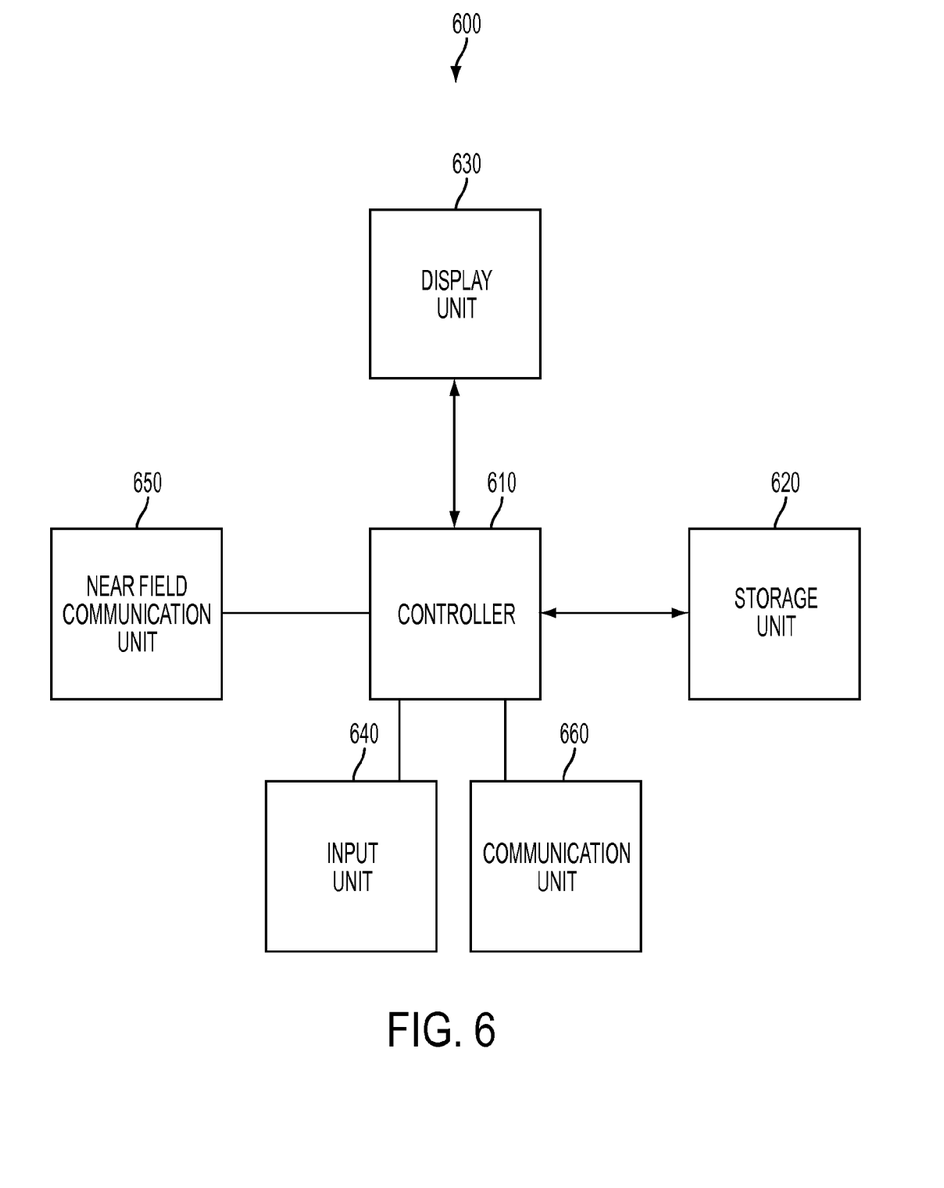
FIG. 6 is block diagram schematically illustrating a configuration of a mobile terminal according to an exemplary embodiment of the present invention.

FIG. 6 is block diagram schematically illustrating a configuration of a mobile terminal according to an exemplary embodiment of the present invention.

Referring to FIG. 6, the mobile terminal 600 includes a controller 610, a storage unit 620, a display unit 630, an input unit 640, a NFC unit 650, and a communication unit 660.

According to exemplary embodiments of the present invention, the mobile terminal 600 may be configured to transfer data from at least one device (e.g., a mobile terminal). The mobile terminal 600 may be configured to pair with another device using NFC when the mobile terminal 600 is brought into close proximity with the other device. According to exemplary embodiments of the present invention, the mobile terminal 600 may be paired with more than one other device. Upon pairing using NFC, the mobile terminal 600 may communicate with the other device to paste or download data from the mobile terminal 600. According to exemplary embodiments of the present invention, the mobile terminal 600 may be configured to select (e.g., enable a user to select) data to paste from the other device. For example, the mobile terminal 600 may be configured to paste data or transfer data from a clipboard that aggregates data for transfer and associates each of the data (e.g., each of the items) with a device authorized to paste or download the data. According to exemplary embodiments of the present invention, the mobile terminal 600 may be configured to communicate with at least one server (e.g., a cloud-based server) so as to transfer the data to and from the other device via the server (e.g., via the cloud). The mobile terminal 600 may be assigned an identifier from the at least one server upon registration of the mobile terminal 600 with the server. The identifier associated with the mobile terminal 600 may be used to communicate over the server and to communicate with other devices via the server.

The storage unit 620 can store user data, and the like, as well a program which performs operating functions according to an exemplary embodiment of the present invention. For example, the storage unit 620 may store a program for controlling general operation of a mobile terminal 600, an Operating System (OS) which boots the mobile terminal 600, and application program for performing other optional functions such as a camera function, a sound replay function, an image or video replay function, a Near Field Communication (NFC) function, and the like. Further, the storage unit 620 may store user data generated according to a user of the mobile terminal, such as, for example, a text message, a game file, a music file, a movie file, and the like. In particular, the storage unit 620 according to exemplary embodiments of the present invention may store an application that enables a user to paste data from a clipboard which aggregates data copied from another device. For example, the storage unit 620 may store an application that indicates that data shared by other devices to which the mobile terminal 600 is paired. The application may also provide an indication of data which the mobile terminal 600 is permitted (e.g., authorized) to paste thereto.

The NFC unit 650 may be configured for communicating with another device via NFC. According to exemplary embodiments of the present invention, the NFC unit 650 may be configured to automatically pair with another device. For example, the NFC unit 650 may pair the mobile terminal 600 with another device when the mobile terminal 600 is brought into close proximity with another NFC-enabled device. The NFC unit 650 communicates connection data with the other NFC-enabled device during the pairing process. The NFC paring may be used to communicate connection information between devices known to each other. If two NFC-enabled devices are unknown to each other, the NFC-enabled devices must be similarly configured to communicate the appropriate information. For example, the mobile terminal 600 and the other NFC-enabled device may be manually set up during configuration. According to exemplary embodiments of the present invention, the NFC unit 650 may transfer or receive some data such as, for example, metadata to the recipient mobile terminal before the recipient mobile terminal confirms the transfer of the data. Data that may be transferred before the recipient mobile terminal confirms the transfer of data may include, for example, a file name, a first few words of text, file or data size, the originating device name, and the like.

The communication unit 660 may be configured for communicating with other devices. For example, the communication unit 660 may be configured to communicate via Bluetooth technology, WiFi technology, or another wireless technology. According to exemplary embodiments of the present invention, after the mobile terminal 600 is paired using NFC, the mobile terminal 600 may transfer data to another device via the communication unit 660. According to exemplary embodiments of the present invention, the communication unit 660 may transfer or receive some data such as, for example, metadata to the recipient mobile terminal before the recipient mobile terminal confirms the transfer of the data. Data that may be transferred before the recipient mobile terminal confirms the transfer of data may include, for example, a file name, a first few words of text, file or data size, the originating device name, and the like.

The input unit 640 may include input keys and function keys for receiving user input. For example, the input unit 640 may include input keys and function keys for receiving an input of numbers or various sets of letter information, setting various functions, and controlling functions of the mobile terminal 600. For example, the input unit 640 may include a calling key for requesting a voice call, a video call request key for requesting a video call, a termination key for requesting termination of a voice call or a video call, a volume key for adjusting output volume of an audio signal, a direction key, and the like. In particular, the input unit 640 according to exemplary embodiments of the present invention may transmit to the controller 610 signals related to selection of data to paste to the mobile terminal 600 or a selection of devices to which the mobile terminal 600 is paired for determining which data is being shared with the mobile terminal 600. Such an input unit 640 may be formed by one or a combination of input means such as a touch pad, a touchscreen, a button-type key pad, a joystick, a wheel key, and the like.

The display unit 630 displays information inputted by user or information to be provided to user as well as various menus of the mobile terminal 600. For example, the display unit 630 may provide various screens according to a user of the mobile terminal 600, such as an idle screen, a message writing screen, a calling screen, and the like. In particular, the display unit 630 according to exemplary embodiments of the present invention can display a menu. The menu may include a list of functions relating to the transfer of data across devices. For example, the menu may include a list including a function corresponding to copying data to a device, pasting data from a device, and the like. The menu may be displayed to enable a user to select data to be transferred and/or to select a device from which the data may be transferred. For example, the display unit 630 may display an interface which the user may manipulate or otherwise enter inputs via a touch screen to enter selection of the data that may be transferred or selection of devices from which the data may be transferred. The display unit 630 can be formed as a Liquid Crystal Display (LCD), an Organic Light Emitting Diode (OLED), an Active Matrix Organic Light Emitting Diode (AMOLED), and the like. However, exemplary embodiments of the present invention are not limited to these examples. Further, the display unit 630 can perform the function of the input unit 640 if the display unit 630 is formed as a touch screen.

According to exemplary embodiments of the present invention, the mobile terminal comprises at least one controller 610. The at least one controller 610 may be configured to operatively control the mobile terminal 600. For example, the controller 610 may control operation of the various components or units included in the mobile terminal 600. The controller 610 may transmit a signal to the various components included in the mobile terminal 600 and control a signal flow between internal blocks of the mobile terminal 600. In particular, the controller 610 according to exemplary embodiments of the present invention can control selection of data to that may be transferred, selection of a device from which the data may be transferred, transmission of an indication of transfer to the device for the data may be transferred, transmission of confirmation of transfer of the data from the other device, and location of the device on a cloud-based system or on a server using an registered address associated with the device. According to exemplary embodiments of the present invention, the controller 610 may be configured to control the receipt of some data such as, for example, metadata, to the recipient mobile terminal before the recipient mobile terminal confirms the transfer of the data. For example, such data may be transferred using NFC or other communication methods. Data that may be transferred before the recipient mobile terminal confirms the transfer of data may include, for example, a file name, a first few words of text, file or data size, the originating device name, and the like. A user of the recipient mobile terminal may view and select which data to proceed with transferring based at least in part on the data transferred before confirmation of the transfer of data. For example, the data transferred before confirmation of the transfer of data may be used to enable a user to make a more informed decision as to which data to paste to the recipient device.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. A method for transferring data from a first mobile terminal to a second mobile terminal, the method comprising:

pairing the first mobile terminal and the second mobile terminal using near field communication (NFC);

receiving, by the first mobile terminal, an indication from a user of the first mobile terminal, the indication indicating at least one item on the first mobile terminal to be transferred;
in response to receiving the indication from the user of the first mobile terminal, selecting, by the first mobile terminal, at least one item on the first mobile terminal to be transferred to the second mobile terminal;
confirming, by the second mobile terminal, transfer of the at least one item to the second mobile terminal; and
transferring, by the first mobile terminal, the at least one item from the first mobile terminal to the second mobile terminal,
wherein the selecting of the at least one item on the first mobile terminal to be transferred to the second mobile terminal comprises copying, by the first mobile terminal, the at least one item to a clipboard that associates any items which a user has indicated as being available for transfer, and
wherein when the at least one item is transferred from the first mobile terminal to the second mobile terminal using a cloud-based connectivity, then the second mobile terminal locates a cloud address associated with the first mobile terminal and downloads the at least one item from the cloud.

2. The method of claim 1, further comprising:
transferring, by the first mobile terminal, the at least one item from the first mobile terminal to the second mobile terminal after the confirming of the transfer of the at least one item to the second mobile terminal.

3. The method of claim 1, wherein the selecting of the at least one item on the first mobile terminal to be transferred to the second mobile terminal comprises:
receiving, by the first mobile terminal, user input that indicates the at least one item to be transferred.

4. The method of claim 1, wherein the selecting of the at least one item on the first mobile terminal to be transferred to the second mobile terminal comprises:
receiving, by the first mobile terminal, user input that indicates which mobile terminal the at least one item is to be transferred.

5. The method of claim 1, wherein the copying of the at least one item to a clipboard that associates any items which the user has indicated as being available for transfer comprises:
registering, by the first mobile terminal, the at least one item copied to the clipboard with at least one identifier each of which is associated with a corresponding mobile terminal to which the at least one item may be transferred.

6. The method of claim 5, wherein the confirming of the transfer of the item to the second mobile terminal comprises:
selecting, by the second mobile terminal, to paste to the second mobile terminal at least one of the items copied to the clipboard.

7. The method of claim 6, wherein the at least one item selected to be pasted corresponds to at least one item registered to the identification associated with the second mobile terminal.

8. The method of claim 1, wherein the at least one item is transferred from the first mobile terminal to the second mobile terminal using at least one of Bluetooth connectivity, WiFi connectivity, or cloud-based connectivity.

9. The method of claim 1, wherein the first mobile terminal uploads the at least one item to the cloud for download by the second mobile terminal after the first mobile terminal receives an indication that the second mobile terminal has selected to paste the at least one item.

10. The method of claim 1, wherein each of the at least one item is one of:
a file stored on the first mobile terminal,
a text that is being displayed to the user of the first mobile terminal,
an image that is being displayed to the user of the first mobile terminal, and
contact information for a contact stored in an address book on the first mobile terminal.

11. The method of claim 1, further comprising:
pairing the first mobile terminal and at least one other mobile terminal using NFC; and
selecting, by the first mobile terminal, at least one of the at least one other mobile terminal as a mobile terminal to which the at least one item is to be transferred.

12. An apparatus for transferring data to at least one mobile terminal, the apparatus comprising:
a near field communication (NFC) unit configured to pair with the at least one mobile terminal;
a communication unit configured to transfer at least one item to the at least one mobile terminal; and
at least one controller configured to:
receive an indication from a user, the indication indicating at least one item on the apparatus to be transferred,
select, in response to receiving the indication from the user, the at least one item to be transferred to the at least one mobile terminal,
copy the selected at least one item to a clipboard that associates any items which a user has indicated as being available for transfer,
receive a confirmation of a transfer of the at least one item to the at least one mobile terminal from the at least one mobile terminal, and
transfer the at least one item to the at least one mobile terminal in response to receiving the confirmation of the transfer from the at least one mobile terminal,
wherein when the communication unit transfers the at least one item using cloud-based connectivity, then the apparatus comprises an identifier that is registered with a cloud-based server such that the at least one mobile terminal to which the at least one item is to be transferred can locate a cloud address associated with the apparatus and download the at least one item from the cloud.

13. The apparatus of claim 12, wherein the at least one controller is further configured to transfer the at least one item to the at least one mobile terminal after the at least one mobile terminal has confirmed transfer of the at least one item.

14. The apparatus of claim 12, wherein the at least one controller is further configured to receive user input that indicates the at least one item to be transferred.

15. The apparatus of claim 12, wherein the at least one controller is further configured to receive user input that indicates which mobile terminal the at least one item is to be transferred.

16. The apparatus of claim 12, wherein the at least one controller is further configured to register the at least one item copied to the clipboard with at least one identifier each of which is associated with a corresponding mobile terminal to which the at least one item may be transferred.

17. The apparatus of claim 16, wherein the at least one controller is further configured to receive an indication that the at least one mobile terminal has selected to paste the at least one item.

18. The apparatus of claim 17, wherein the at least one item selected to be pasted corresponds to at least one item registered to the identification associated with the second mobile terminal.

19. The apparatus of claim 12, wherein the communication unit is further configured to transfer the at least one item using at least one of Bluetooth connectivity, WiFi connectivity, or cloud-based connectivity.

20. The apparatus of claim 12, wherein the at least one controller is further configured to upload the at least one item to the cloud for download by the at least one mobile terminal after the at least one controller receives an indication that at least one mobile terminal has selected to paste the at least one item.

21. An apparatus for receiving data from a mobile terminal, the apparatus comprising:
   a near field communication (NFC) unit configured to pair with the mobile terminal;
   a communication unit configured to receive at least one item associated with a clipboard that associates any items which a user of the mobile terminal has indicated as being available from the mobile terminal; and
   at least one controller configured to:
      receive metadata associated with at least one item associated with the clipboard available to be transferred from the mobile terminal,
      prompt a user for an indication as to whether to receive the at least one item associated with the clipboard available from the mobile terminal,
      determine whether to confirm a transfer of the at least one item based at least in part on the metadata associated with the at least one item associated with the clipboard available, and
      send confirmation of the transfer of the at least one item associated with the clipboard available to the mobile terminal in response to determining to confirm transfer of the at least one item,
   wherein when the communication unit receives the at least one item using cloud-based connectivity, then the at least one controller is further configured to:
      locate a cloud address associated with the mobile terminal, and
      download the at least one item from the cloud.

22. The apparatus of claim 21, wherein the at least one controller is further configured to receive the at least one item from the mobile terminal after the at least one controller confirms of the transfer of the at least one item.

23. The apparatus of claim 21, wherein the at least one controller is further configured to receive information associated with at least one item copied to the clipboard for which an identifier associated with the apparatus is registered by the mobile terminal.

24. The apparatus of claim 23, wherein the at least one controller is further configured to select to paste to the apparatus at least one of the items copied to the clipboard.

25. The apparatus of claim 24, wherein the at least one item selected to be pasted corresponds to at least one item registered to the identification associated with the apparatus.

26. The apparatus of claim 21, wherein the communication unit is further configured to receive the at least one item using at least one of Bluetooth connectivity, WiFi connectivity, or cloud-based connectivity.

27. The apparatus of claim 21, wherein the at least one controller is further configured to transmit an indication that the apparatus has selected to paste the at least one item before the mobile terminal uploads the at least one item to the cloud.

28. The apparatus of claim 21,
   wherein the NFC unit is further configured to pair with at least one other mobile terminal, and
   wherein the at least one controller is further configured to receive data from at least one of the at least one other mobile terminal.

29. A system for transferring data from a first mobile terminal to a second mobile terminal, the apparatus comprising:
   the first mobile terminal; and
   the second mobile terminal,
   wherein the first mobile terminal comprises:
      a near field communication (NFC) unit configured to pair with the second mobile terminal;
      a communication unit configured to transfer at least one item to the second mobile terminal; and
      at least one controller configured to:
         receive an indication from a user of the first mobile terminal, the indication indicating at least one item on the first mobile terminal to be transferred,
         select, in response to receiving the indication from the user of the first mobile terminal, the at least one item to be transferred to the at second mobile terminal,
         copy the selected at least one item to a clipboard that associates any items which a user has indicated as being available for transfer,
         receive a confirmation of a transfer of the at least one item to the second mobile terminal from the second mobile terminal, and
         transfer the at least one item from the first mobile terminal to the second mobile terminal in response to receiving the confirmation of the transfer from the second mobile terminal,
   wherein the second mobile terminal comprises:
      an NFC unit configured to pair with the first mobile terminal;
      a communication unit configured to receive the at least one item associated with the clipboard that associates any items which the user of the first mobile terminal has indicated as being available from the first mobile terminal; and
      at least one controller configured to:
         receive metadata associated with at least one item associated with the clipboard available to be transferred to the second mobile terminal,
         prompt a user of the second terminal for an indication as to whether to receive the at least one item associated with the clipboard available from the first mobile terminal,
         determine whether to confirm a transfer of the at least one item based at least in part on the metadata associated with the at least one item associated with the clipboard available, and
         send confirmation of the transfer of the at least one item associated with the clipboard available to the second mobile terminal in response to determining to confirm transfer of the at least one item, and
   wherein when the at least one item is transferred from the first mobile terminal to the second mobile terminal using a cloud-based connectivity, then the second mobile terminal locates a cloud address associated with the first mobile terminal and downloads the at least one item from the cloud.

30. A method for transferring data from a first mobile terminal to a second mobile terminal, the method comprising:

establishing, by the first mobile terminal, a connection with the second mobile terminal using a near field communication (NFC);

receiving, by the first mobile terminal, an indication from a user of the first mobile terminal, the indication indicating at least one item on the first mobile terminal to be transferred;

in response to receiving the indication from the user of the first mobile terminal, selecting, by the first mobile terminal, at least one item on the first mobile terminal to be transferred to the second mobile terminal;

receiving, by the first mobile terminal, a confirmation of a transfer of the at least one item to the second mobile terminal, from the second mobile terminal; and in response to receiving the confirmation of the transfer, transferring, by the first mobile terminal, the at least one item from the first mobile terminal to the second mobile terminal, wherein the selecting of the at least one item on the first mobile terminal to be transferred to the second mobile terminal comprises copying, by the first mobile terminal, the at least one item to a clipboard that associates any items which the user has indicated as being available for transfer, and wherein when the at least one item is transferred from the first mobile terminal to the second mobile terminal using a cloud-based connectivity, then the second mobile terminal locates a cloud address associated with the first mobile terminal and downloads the at least one item from the cloud.

31. A method for transferring data from a first mobile terminal to a second mobile terminal, the method comprising:

establishing, by the first mobile terminal, a connection with the second mobile terminal using a near field communication (NFC);

receiving, by the first mobile terminal, an indication from a user of the first mobile terminal, the indication indicating at least one item on the first mobile terminal to be transferred;

copying, by the first mobile terminal, the at least one item to a clipboard that associates any items which a user has indicated as being available for transfer, receiving, by the second mobile terminal, metadata associated with the at least one item copied to the clipboard available to be transferred to the second mobile terminal;

determining, by the second mobile terminal, whether to confirm a transfer of the at least one item copied to the clipboard available to the second mobile terminal based at least in part on the metadata associated with the at least one item;

in response to determining to confirm transfer of the at least one item, sending, by the second mobile terminal, confirmation of the transfer of the at least one item to the first mobile terminal; and receiving, by the second mobile terminal, the at least one item, from the first mobile terminal, wherein when the at least one item is transferred from the first mobile terminal to the second mobile terminal using a cloud-based connectivity, then the second mobile terminal locates a cloud address associated with the first mobile terminal and downloads the at least one item from the cloud.

* * * * *